United States Patent [19]

Takizawa

[11] 4,052,843
[45] Oct. 11, 1977

[54] APPARATUS FOR PREVENTING SURGING OF A GAS TURBINE

[75] Inventor: Masaaki Takizawa, Mishima, Japan

[73] Assignee: Toyota Jidosha Kogyo Kabushiki Kaisha, Toyoda, Japan

[21] Appl. No.: 616,016

[22] Filed: Sept. 23, 1975

[30] Foreign Application Priority Data

June 4, 1975   Japan .................... 50-67978

[51] Int. Cl.² .................................. F02C 9/08
[52] U.S. Cl. ................................... 60/39.28 R
[58] Field of Search ............ 60/39.29, 39.27, 39.28 R

[56] References Cited
U.S. PATENT DOCUMENTS

| | | | |
|---|---|---|---|
| 2,821,067 | 1/1958 | Hill | 60/39.16 R |
| 2,971,328 | 2/1961 | McLafferty | 60/39.29 |
| 3,080,712 | 3/1963 | Wood | 60/39.29 |
| 3,133,416 | 5/1964 | Mock | 60/39.29 X |
| 3,439,497 | 4/1969 | Cross | 60/39.29 |
| 3,533,238 | 10/1970 | Marvin | 60/39.29 X |
| 3,609,966 | 10/1971 | Guillot | 60/39.16 R |
| 3,868,625 | 2/1975 | Speinger | 60/39.28 R |
| 3,902,317 | 9/1975 | Katsume | 60/39.16 R |

Primary Examiner—Clarence R. Gordon
Attorney, Agent, or Firm—Stevens, Davis, Miller & Mosher

[57] ABSTRACT

Apparatus for preventing surging of a gas turbine especially for a motor car. According to one embodiment of this invention, the apparatus is provided with its main information which is composed of the differential pressure $\Delta P$ between the air immediately inwardly of the air filter of the gas turbine and the air at the compressor inlet. When the differential pressure $\Delta P$ reaches approximately the critical value $\Delta Ps$ at which surging occurs at each number N of rpm of the gas turbine, i.e., ($\Delta P - \Delta Ps$) is almost 0, fuel control means are operative to control the fuel supply to the gas turbine, thereby preventing surging. According to another embodiment, the apparatus is provided with its main information for preventing surging of the gas turbine from the ratio of the differential pressure $\Delta P$ between the pressure PIN of the air immediately inwardly of the air filter and the air pressure at the inlet of the compressor to PIN, i.e., $\Delta P/PIN$. When $\Delta P/PIN$ reaches approximately the critical value $(\Delta P/PIN)s$ at which surging occurs at each $N/\sqrt{TIN}$ (N: number of rpm of the gas turbine, T: temperature of the air immediately inwardly of the air filter), i.e., $(\Delta P/PIN - (\Delta P/PIN)s)$ is almost 0, fuel supply control means become operative to control fuel supply to the gas turbine, thereby preventing surging. As the conditions of the incoming air such as PIN and TIN are taken into consideration, the apparatus according to this invention can prevent surging when the car is driven at a high altitude, when the weather conditions, e.g., PIN or TIN are changeable or when the air filter is clogged.

6 Claims, 11 Drawing Figures

APPARATUS FOR PREVENTING SURGING OF A GAS TURBINE

BACKGROUND OF THE INVENTION

For preventing surging of a gas turbine, there have been the following types of apparatus:

A. The apparatus which controls the fuel supply by detecting the turbine inlet gas temperature or the temperature directly associated with the turbine inlet gas temperature and feeding it back to the fuel control valve. This apparatus, however, has a number of defects as follows:

a. As the turbine inlet gas temperature which ranges from 900° C to 1,200° C usually differs from one place to another by 50° C to 100° C, it is very difficult to get the average gas temperature at the turbine inlet.

b. High temperature of such gas decreases the durability and accuracy of the temperature detector.

c. Owing to its heat capacity, the temperature detector can not instantaneously follow the change in temperature of the gas; therefore the real temperature of the gas can only be detected with a certain time lag. Additional means is required to compensate for this time lag, but none of such means known in the art is very reliable, despite its complicated structure.

d. In order to make up the low accuracy and low responsiveness of the temperature detector, it is necessary to establish an excessively safe or conservative control pattern, from which no highly efficient control of fuel supply can be expected.

e. The basic problem with this type of apparatus resides in its attempt to prevent surging which is due to an abrupt change in air pressure, by controlling fuel supply in response to change in the turbine inlet gas temperature.

B. The apparatus according to the so-called CDP-bellows method in which a signal corresponding to the pressure PCD of air at the compressor outlet is transmitted to the bellows, thereby operating the needle valve associated therewith for controlling fuel supply. This apparatus also has a number of defects.

a. This mechanism is intended primarily for an aircraft gas turbine operating with a high pressure ratio which changes within the range wherein surging is apt to occur. A gas turbine for a motor car is provided with a heat exchanger to reduce fuel consumption and is necessarily adapted to operate at a low pressure ratio wherein the compressor outlet air pressure PCD hardly changes within the range wherein surging is apt to occur. Thus, the CDP-bellows method is not applicable to gas turbines for motor cars, but can only be used for a complicated hydro-mechanical fuel supply control system.

b. The hydro-mechanical system does not permit a highly efficient fuel supply control.

c. This apparatus does not allow any rectification against clogging of air filters or environmental changes, for example, of ambient pressure or temperature, to which motor cars are frequently subjected. The information necessary for preventing surging of the gas turbine is the pressure ratio in the compressor, i.e., PCD/pressure at the air intake, but the bellows receives in principle (PCD - (Pressure at the air intake)). This apparatus also does not allow any rectification for the change in ambient temperature.

SUMMARY OF THE INVENTION

The apparatus according to one embodiment of this invention prevents surging of a gas turbine electronically by continuously detecting the differential pressure $\Delta P$ (between the air immediately inwardly of the air filter and the air at the compressor rotor inlet) at the bell-mouthed air intake where air flow is measured, comparing the detected differential pressure $\Delta P$ with the critical differential pressure $\Delta Ps$ at which surging begins to occur at each number N of rpm of the engine, and controlling the fuel supply at a predetermined ratio when $\Delta P$ approaches $\Delta Ps$.

Another embodiment of this invention receives as the operational information the absolute pressure PIN and temperature TIN of the air in the air intakes as well as the differential pressure $\Delta P$. The prevention of surging is achieved electronically by continuously comparing $\Delta P/PIN$ with the critical value $(\Delta P/PIN)s$ at which surging occurs in response to each $N/\sqrt{TIN}$ and reducing fuel supply to the gas turbine in a predetermined proportion when $(\Delta P/PIN)$ approaches $(\Delta P/PIN)s$.

An object of this invention is to provide an apparatus for preventing surging of a gas turbine with excellent control efficiency which receives as the main information the differential pressure $\Delta P$ between the air immediately inwardly of the air filter and the air at the compressor rotor inlet in place of the turbine inlet gas temperature, thereby avoiding all the defects with which the prior art apparatus is accompanied.

Another object of this invention is to provide an apparatus for preventing surging of gas turbines which operates without any time lag in response to changes in the ambient conditions (such as ambient pressure or temperature) or clogging of the air filter.

It is a further object of this invention to provide an apparatus for preventing surging by controlling fuel supply to the gas turbine, which is to be applied to the gas turbine for a motor car with a low pressure ratio and a great change of the differential pressure $\Delta P$ within the range wherein surging is apt to occur, irrespective of the installation of a heat exchanger.

In accomplishing the above objects, there is provided, in accordance with this invention, an apparatus including a differential pressure gauge for detecting the differential pressure $\Delta P$ and a pressure gauge for detecting the pressure of the air immediately inwardly of the air filter, which are small enough to be installed in the gas turbine, simple in structure and responsive with only a little time lag (about $10^{msec}$).

BRIEF DESCRIPTION OF THE DRAWINGS

Preferred embodiments of this invention are shown in the accompanying drawings in which.

DETAILED DESCRIPTION OF THE PREFERRED EMBODIMENTS

Figure 1:
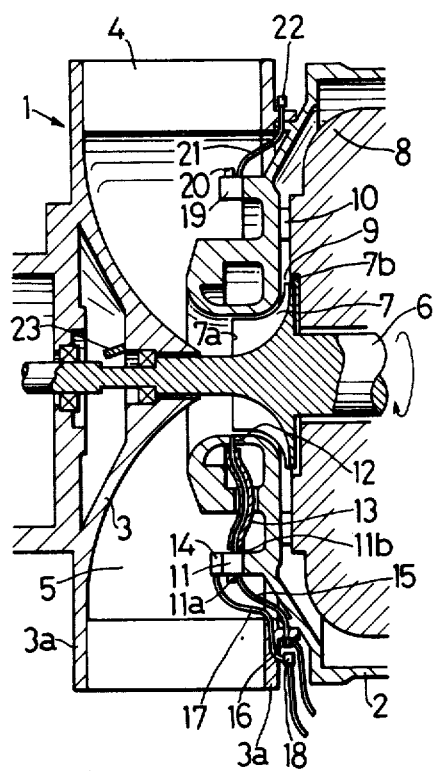
FIG. 1 is a side elevational view in vertical cross section of the apparatus of this invention shown with a compressor rotor of the gas turbine.

In FIG. 1, there is shown a motor car gas turbine or engine 1 having an outer casing 2 which is provided with an air intake casing 3 at its frontal part. An annular air filter 4 is attached to the outer periphery 3a of the air intake casing 3. The outer casing 2 and the air intake casing 3 define a bell-mouthed air intake 5 therebetween. The engine 1 comprises a shaft 6, around which the rotor 7 of a centrifugal compressor is disposed. The rotor 7 has an inlet 7a opening at the center of the air intake 5, and an outlet 7b connected to an air passage 9 defined between the outer casing 2 and an inner casing 8, the passage 9 including a diffuser 10. A small differential pressure gauge 11 is provided in the air intake 5 and mounted on the frontal end of the outer casing 2 at the position just inwardly of the air filter 4. The differential pressure gauge 11 has a pair of oppositely projecting openings 11a, 11b at its bottom and top, respectively, the bottom opening 11a extending toward the air filter 4. The other opening 11b is connected through a pipe 13 to an opening 12 provided in the outer casing 2 near the rotor inlet 7a. A small thermometer 14 using a semiconductor diode is disposed at the frontal end of the differential pressure gauge 11 to detect the temperature TIN of the air immediately inwardly of the air filter 4. The differential pressure ΔP between the air pressures at the openings 11a and 11b, i.e., between the pressure PIN of the air immediately inwardly of the air filter 4 and the air pressure PRIN at the rotor inlet 7a, is transformed into an electric signal through the differential pressure gauge 11, the structure of which will be later mentioned. The electric signal is transmitted to a ΔP amplifier 30 or 40 (described later in detail) through a lead wire 15 and a connector 16 extending from the outer periphery 3a of the outer casing 3. A signal corresponding to the air temperature TIN is also transmitted to a TIN amplifier 43 (described later in detail) through a lead wire 17 and a connector 18.

The air pressure PIN is detected by a small pressure gauge 19 with a projecting opening 20, through which the pressure of the air immediately inwardly of the air filter 14 is led into the pressure gauge 19. The air pressure PIN is transformed through the pressure gauge 19, the structure of which will be later mentioned, into an electric signal which is transmitted to a PIN amplifier 41 (described later in detail) through a lead wire 21 and a connector 22 extending from the outer periphery 3a of the outer casing 3. The detector 23 which is attached to the air intake casing 3 near the shaft 6 measures the rotational speed of the shaft 6.

Figure 5:
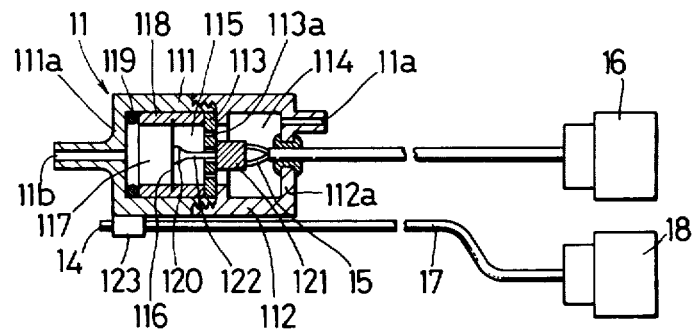
FIG. 5 is a schematic view of a differential pressure gauge and a thermometer.

Referring to FIG. 5, the differential pressure gauge 11 comprises a pair of cylindrical members 111 and 112 threadedly engaged with each other. The casing 111 has an end wall 111a from which the tubular opening 11b axially extends, and the casing 112 also has an end wall 112a from which the tubular opening 11a extends. A partition wall 113 with a plurality of apertures 113a divides the differential pressure gauge 11 into two pressure chambers 114, 115 and a resilient membrane 116 separates the presssure chamber 115 from another pressure chamber 117. The pressure chambers 114, 117 are connected to the tubular openings 11a, 11b respectively.

The resilient membrane 116 is supported by a cylindrical spacer 118 in the casing 111. An O ring 119 is disposed between the spacer 118 and the end wall 111a of the casing 111, against which the O ring 119 is compressed when the two casings 111, 112 are engaged with each other. A semiconductor gauge 120 carried on the resilient membrane 116 in the pressure chamber 115 is connected through a lead wire 122 to a temperature compensation circuit 121 mounted on the partition wall 113 in the pressure chamber 114 and connected to the connector 16 through the lead wire 15. The fixture 123 is attached to the outer wall of the casing 111 to carry the small thermometer 14 thereon.

In operation of the differential pressure gauge 11, the air pressure PRIN at the compressor rotor inlet 7a is transmitted to the pressure chamber 117 through the opening 12, the pipe 13 and the opening 11b, while the pressure PIN of the air immediately inwardly of the air filter 4 is transmitted to the pressure chamber 114 through the opening 11a, further to the other pressure chamber 115 through the opening 113a of the partition-wall 113. When there is any difference between the pressures in the two pressure chambers 115 and 117, the differential pressure ΔP between PIN and PRIN deforms the resilient membrane 116, thereby changing the electric resistance in the semiconductor gauge 120. The change of the resistance is transmitted to the ΔP amplifier 30 (FIG. 2a) through the lead wire 122, the temperature compensation circuit 121, the lead wire 15 and the connector 16.

Figure 6:
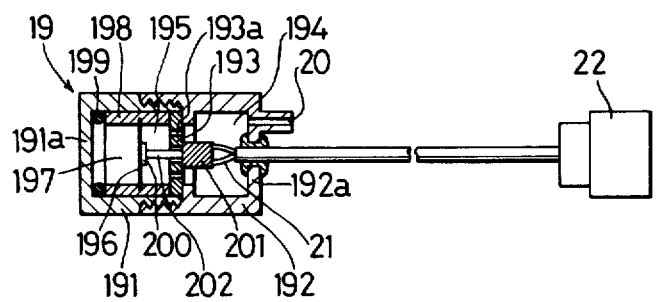
FIG. 6 is a schematic view of a pressure gauge.

In FIG. 6, the pressure gauge 19 is formed by two cylindrical casings 191, 192 threadedly engaged with each other. The end wall 192a of the casing 192 is provided with the projecting opening 20. The pressure gauge 19 is divided into two pressure chambers 194, 195 by a partition wall 193 with a plurality of small openings 193a, and a resilient membrane 196 separates the pressure chamber 195 from an adjacent reference pressure chamber 197. The pressure in the reference pressure chamber 197 is maintained at a level equal to an absolute vacuum. The resilient membrane 196 is supported by a cylindrical spacer 198 in the casing 191. The O ring 199 inserted between the spacer 198 and the end wall 191a of the casing 191 is compressed therebetween when the casings 191 and 192 are engaged with each other. In the pressure chamber 195 the resilient membrane 196 carries a semiconductor gauge 200 which is connected through a lead wire 202 to a temperature compensation circuit 201 mounted on the partition wall 193. The temperature compensation circuit 201 is connected through the lead wire 21 to the connector 22. The differential pressure between the reference pressure chamber 197 which is maintained at an absolute vacuum and the pressure chamber 195, i.e., the pressure PIN of the air immediately inwardly of the air filter 4 deforms the resilient membrane 196, causing change in resistance of the semiconductor gauge 200, which is transmitted to the PIN amplifier 41 (FIG. 2b) through the lead wire 202, the temperature compensation circuit 201, the lead wire 21 and the connector 22.

Figure 3A:
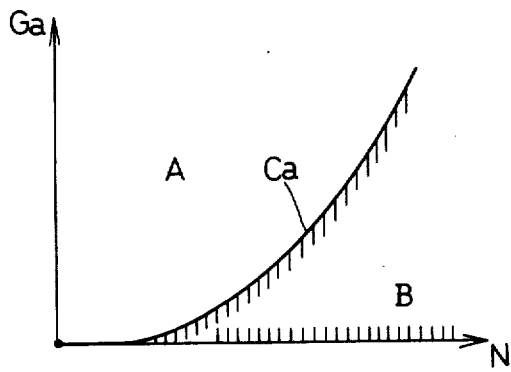
FIGS. 3a, 3b and 3c show curves defining the safe operating area of the gas turbine and surging occuring area.
Figure 3B:
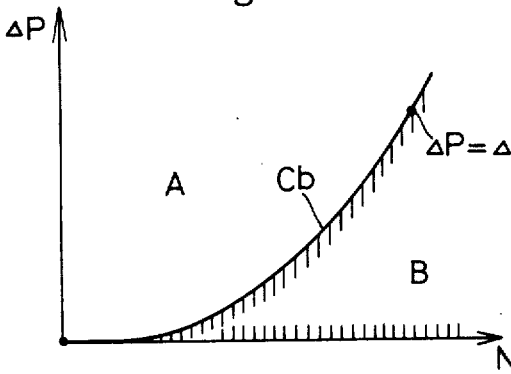
Figure 4A:
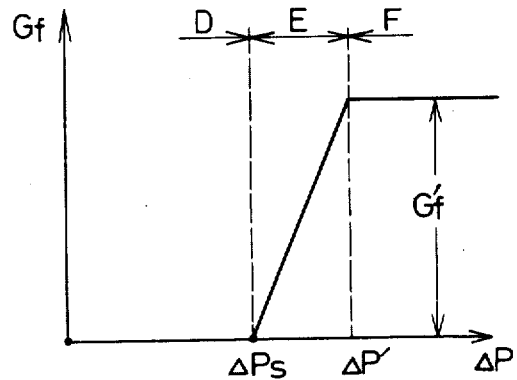
FIGS. 4a and 4b show the controlled value of fuel supply around surging occuring area and safe operation area.

In operation of the pressure gauge 19, the air intake 5 of bell-mouthed shape in cross section, defined by the air filter 4 and the rotor inlet 7a can be used as a flow meter to detect the incoming air flow Ga Kg/sec, in accordance with the following equation;

$$Ga = K\sqrt{\frac{PIN \Delta P}{TIN}} \quad (1)$$

where,
K is a coefficient characteristic to each engine,
the unit of PIN and $\Delta P$ is Kg/cm$^2$,
The unit of TIN is °K. When PIN and TIN which are usually almost changeless are considered to be constant, the following equation is obtained:

$$Ga = K'\sqrt{\Delta P} \quad (2)$$

where, K' is a coefficient characteristic to each engine. Curve Ca in FIG. 3a shows the incoming air flow Ga as a function of the number N of rpm of the engine at surging. Curve Cb in FIG. 3b shows the relation of Curve Ca in FIG. 3a in functions of $\Delta Ps$ and N. $\Delta Ps$ is proportional to N$^n$ and $n$ is 2 to 5 in general. The shape of Curve Cb depends on the characteristics of the engine. Each point on Curbe Cb in FIG. 3b shows the critical differential pressure $\Delta Ps$ at which surging starts to occur at each number N of rpm of the engine 1. In the area A above Curves Ca and Cb in FIGS. 3a and 3b respectively, the gas turbine operates normally, while in the area B below Curves Ca and Cb surging occurs. $\Delta P$ is compared with $\Delta Ps$ continuously during operation and when $\Delta P$ approaches $\Delta Ps$, the fuel supply of Gf Kg/sec is reduced according to the Gf - $\Delta P$ graph in FIG. 4a to prevent surging. In the area D where $\Delta Ps$ is greater than $\Delta P$ in FIG. 4a, surging occurs, in the area E where $\Delta P'$ is greater than $\Delta P$ which is greater than $\Delta Ps$, surging is apt to occur and in the area F where $\Delta P$ is greater than $\Delta P'$ the engine is operative normally. In the area F the fuel supply Gf is maintained at a predetermined value Gf', while in the area E where $\Delta P'$ is greater than $\Delta P$ which is greater than $\Delta Ps$, Gf increases from O to Gf' at a constant rate. $\Delta P'$ is a minimum differential pressure to operate the engine normally. In the area E the fuel supply Gf is reduced, causing drop of the turbine inlet gas temperature and increase of the air flow Ga into the engine 1, which eliminates the possibility of surging.

Figure 2A:
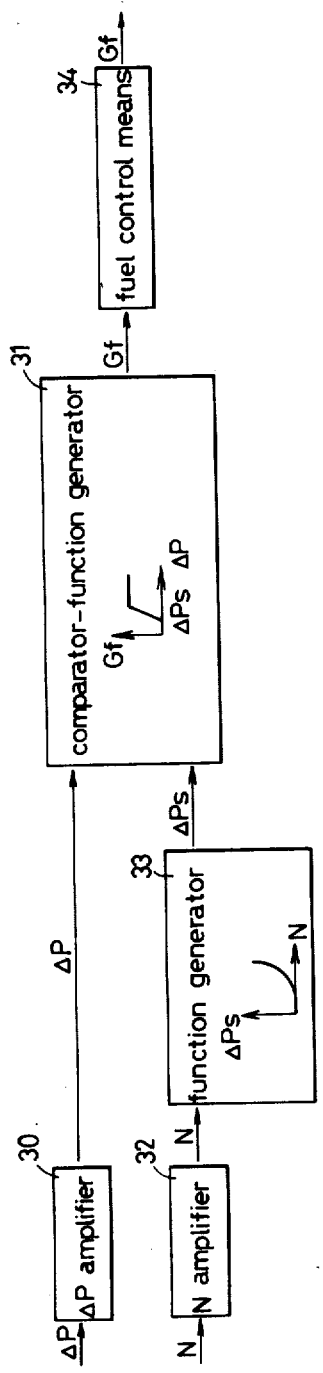
FIGS. 2a and 2b are schematic diagrams showing the fuel supply control system.

The flow chart in FIG. 2a shows the above mentioned control system. The differential pressure $\Delta P$ transformed into an electric signal is amplified by $\Delta P$ amplifier 30, then transmitted to a comparator-function generator 31, while the number N of rpm of the engine transformed into a pulse signal is transmitted to a N amplifier 32 which transmits a DC signal to the input of a function generator 33, which in turn transmits a function defining the critical differential pressure $\Delta Ps$ at which surging occurs, i.e., the curve shown in FIG. 3b. The function is transmitted to the comparator-function generator 31, which, by comparing $\Delta P$ with $\Delta Ps$, transmits a signal Gf to a fuel control means 34, which is operated thereby to control the fuel supply Gf to the engine 1.

Figure 3C:
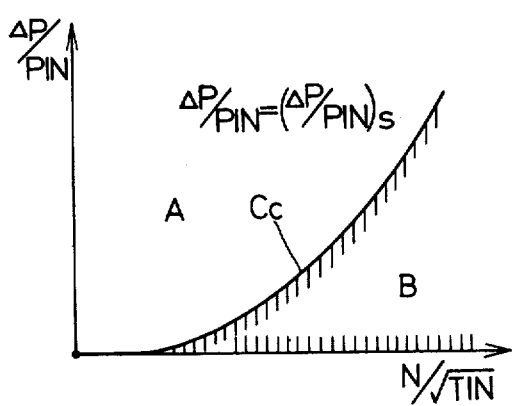
Figure 4B:
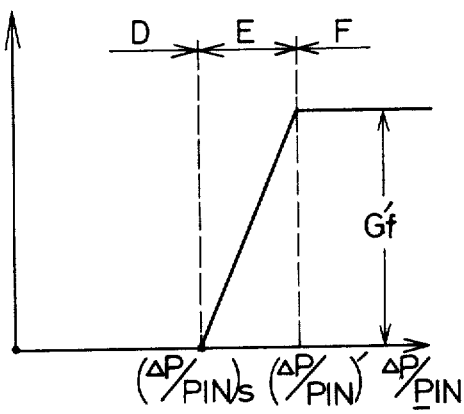

In the above description the conditions of the air inhaled into the engine such as PIN or TIN are supposed to be constant. When the gas turbine is, however, applied to a motor car, it must match with the fluctuations of PIN or TIN owing to many factors such as a high altitude drive, change of the climate, for example, of ambient pressure or temperature, or clogging of the air filter. In that case, the fuel supply Gf is controlled in such a manner that according to the law of similarity of the gas turbine, $$Ga \cdot \frac{\sqrt{TIN}}{PIN}$$

is used in place of Ga, and N/$\sqrt{TIN}$ in place of N, then the following equation is obtained:

$$Ga \cdot \frac{\sqrt{TIN}}{PIN} = K \cdot \sqrt{\frac{PIN \cdot \Delta P}{TIN}} \cdot \frac{\sqrt{TIN}}{PIN} = K \cdot \sqrt{\frac{\Delta P}{PIN}}$$

and;
N → N/$\sqrt{TIN}$ where $\Delta P/PIN$ and N/$\sqrt{TIN}$ are information to control the fuel supply Gf. The graph in FIG. 3c is obtained by replacing $\Delta P$ and N in FIG. 3b with $\Delta P/PIN$ and N/$\sqrt{TIN}$ respectively, Curve Cc which shows the same relation as Curve Cb in FIG. 3b irrespective of the fluctuations of PIN and TIN and which is defined according to the characteristic of the engine. ($\Delta P/PIN$)s is proportional to (N/$\sqrt{TIN}$)$^n$ and $n$ is 2 to 5 in general. Curve Cc in FIG. 3c defines the area A in which a gas turbine is operative normally and the area B in which surging will occur. The abscissa represents the $\Delta P/PIN$ in FIG. 4b in place of $\Delta P$ in FIG. 4a. In FIG. 4b, surging occurs in the area D where $\Delta P/PIN$ is smaller than ($\Delta P/PIN$)s, while surging is apt to occur in the area E where ($\Delta P/PIN$)' is greater than $\Delta P/PIN$ which is in turn greater than ($\Delta P/PIN$)s, and the gas turbine is operative normally in the area F where $\Delta P/PIN$ is greater than ($\Delta P/PIN$)'. In the area F a constant fuel supply Gf' is given to the gas turbine, and in the area E where ($\Delta P/PIN$)' is greater than $\Delta P/PIN$ which is in turn greater than ($\Delta P/PIN$)s, Gf shows a linear increase from O to Gf'. ($\Delta P/PIN$)' is the mininum value of $\Delta P/PIN$ at which the gas turbine is operative normally.

In the area E, according to the reduction of fuel supply Gf the turbine inlet gas temperature becomes lower and the air flow into the engine increases, which prevents surging.

Figure 2B:
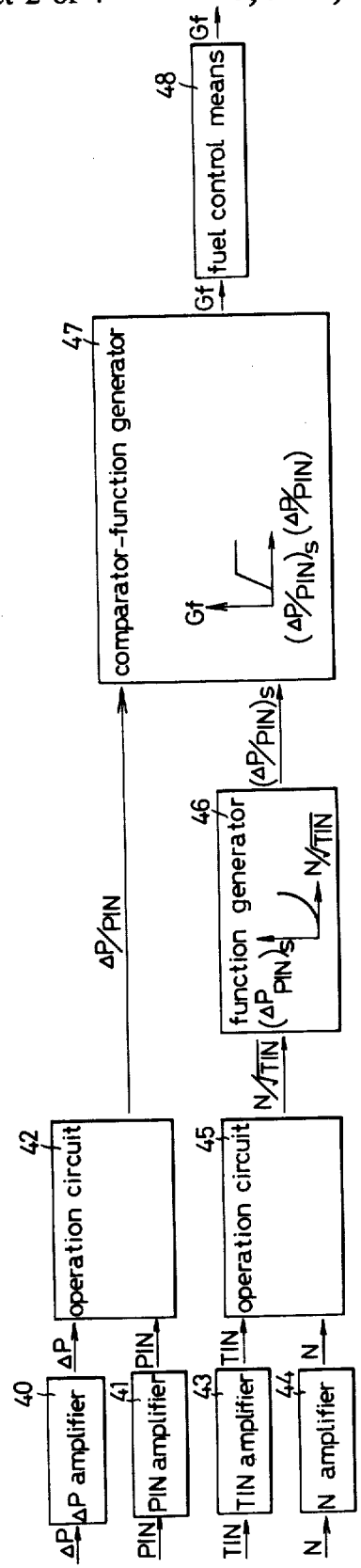

The above control system is illustrated in the flow chart of FIG. 2b. In FIG. 2b, the differential pressure $\Delta P$ and the pressure PIN of the air immediately inwardly of the air filter, which are transformed into electric signals, and amplified by $\Delta P$ amplifier 40 and PIN amplifier 41 respectively, are transmitted to an operation circuit 42, which transmits $\Delta P/PIN$ to the input of a comparator-function generator 47.

The air temperature TIN and the number N of rpm of the engine, which are transformed into electric signals, and amplified by TIN amplifier 43 and N amplifier 44 respectively, are transmitted to an operation circuit 45, which transmits N/$\sqrt{TIN}$ to a function generator 46, which in turn transmits a function that traces Curve Cc in FIG. 3c and defines the critical value ($\Delta P/PIN$)s at which surging occurs to the input of the comparator-function generator 47. The comparator-function generator 47 compares the two input signals of $\Delta P/PIN$ and ($\Delta P/PIN$)s, and transmits a signal Gf according to the graph in FIG. 4b. The signal Gf is transmitted to a fuel control means 48 to set it in operation to control the fuel supply Gf to the engine 1.

The $\Delta Ps$ function generator 33 in FIG. 2a is a non-linear amplifier with negative feedback by an IC operation circuit. The IC operation circuit may comprise any appropriate conventional circuit, e.g., Toshiba model number TA7504M, and the number N of rpm of the engine is transmitted thereto, while the output therefrom is negatively fed back to the inverted input of the IC amplifier through a resistance and diode, and amplification degree is changed at every moment in such a manner as drawing folded lines thereby. Therefore the final output of the IC amplifier draws a non-linear curve composed of a number of folded lines quite similar to the predetermined curve showing the relation between the differential pressure $\Delta P$ and the number N of rpm of the engine. ($\Delta P/PIN$)s function generator 46 in FIG. 2b has the same characteristics as $\Delta Ps$ function generator 33.

The comparator-function generator 31 in FIG. 2a is a function generator proportionally amplifying functions by an IC operation amplifier. $\Delta P$ and $-\Delta Ps$, inverted signal of $\Delta Ps$, are transmitted at a time to the function generator 31, which transmits an output signal in response to the difference between $\Delta P$ and $\Delta Ps$. The maximum value of the output is defined according to the power source voltage of the IC operation amplifier, while the minimum is limited to OV by the diode.

The comparator-function generator 47 in FIG. 2b, operating in the same manner as the comparator-function generator 31 in FIG. 2a, receives $\Delta P/PIN$ and $-(\Delta P/PIN)$s, and transmits a signal in response to the difference between $\Delta P/PIN$ and $(\Delta P/PIN)$s.

Figure 7:
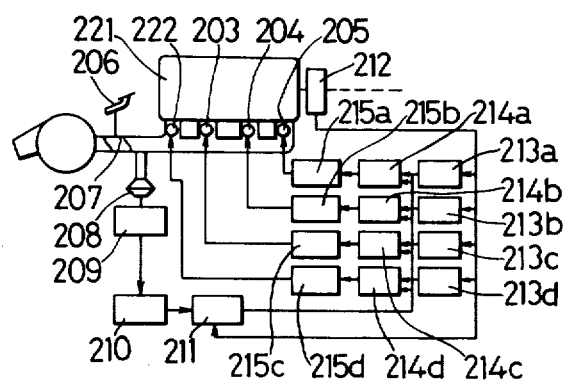
FIG. 7 is a schematic diagram of the known fuel injection apparatus disclosed in the Japanese Patent Office Official Patent Gazette No. 47-26527.

The fuel control means 34, 48 shown in FIGS. 2a, 2b respectively may be any prior electronically controlled fuel injection system. The fuel injection means in FIG. 7, disclosed in the Japanese Patent Office Official Patent Gazette No. 47-26527, can, for example, be applied to control the fuel supply, a. by omitting the negative pressure detector 208, oscillator 209 frequency-voltage converter 210 and correction circuit 211;

b. by transmitting to the differential amplifiers 214a, 214b, 214c, 214d the output signal Gf from the comparator-function generators 31, 47 in place of the output signal from the correction circuit 211;

c. and by installing a generator for transmitting output signals of a predetermined frequency in place of the revolution detector 212 to fix the number of times of fuel injection per second from the solenoid valves 222, 203, 204, 205 and to change time for fuel injection in response to the signal Gf.

What I claim is:

1. Apparatus for preventing surging of a gas turbine for an automobile, said gas turbine having an inlet air filter, a compressor and a bell-mouthed air intake positioned between said inlet air filter and said compressor, said apparatus comprising:

a differential pressure gauge which transmits an electric output signal responsive to the differential pressure $\Delta P$ between the air pressure immediately downstream of said air filter and the air pressure at the inlet of said compressor;

a function generator which receives each number N of rpm of the engine as an electric signal and transmits an output signal corresponding to the critical differential pressure $\Delta Ps$ which causes surging at said number N of rpm of said gas turbine; and a comparator-function generator which receives $\Delta P$ and $-\Delta Ps$ as input signals and transmits an output signal to control fuel control means when $\Delta P$ approaches $\Delta Ps$.

2. Apparatus of claim 1 wherein said function generator generates $\Delta Ps$ proportional to $N^n$, $n$ being 2 to 5.

3. Apparatus of claim 1 wherein, said comparator-function generator compares said $\Delta P$ with said $\Delta Ps$ and transmits signals to stop fuel supply to said gas turbine when $\Delta P$ is equal to $\Delta Ps$, and controls fuel supply in porportion to the difference between $\Delta P$ and $\Delta Ps$ until $\Delta P$ reaches a minimum differential pressure $\Delta P'$ for avoiding surging within the range wherein $\Delta P$ is greater than $\Delta Ps$, while to provide a constant fuel supply within the range wherein $\Delta P$ is equal to or greater than $\Delta P'$.

4. Apparatus for preventing surging of a gas turbine for an automobile, said gas turbine having an inlet air filter, a compressor and a bell-mouthed air intake positioned between said inlet air filter and said compressor, said apparatus comprising:

an operation circuit which receives an electric input signal corresponding to the differential pressure $\Delta P$ between the air pressure immediately downstream of said air filter and the air pressure at the inlet of said compressor, and the absolute pressure PIN of the air immediately inwardly of an inlet of said air intake, and transmits $\Delta P/PIN$ as an output signal;

another operation circuit which receives as electrical inputs the temperature TIN of the air immediately inwardly of said air intake inlet and the number N of rpm of said gas turbine and transmits an output signal $N/\sqrt{TIN}$;

a function generator which receives said output signal $N/\sqrt{TIN}$ and transmits a critical value $(\Delta P/PIN)s$ of $\Delta P/PIN$ at which surging occurs in response to $N/\sqrt{TIN}$; and a comparator-function generator which receives input signals of $\Delta P/PIN$ and $-(\Delta P/PIN)s$ and transmits an output signal to control fuel supply means when $\Delta P/PIN$ approaches $(\Delta P/PIN)s$.

5. Apparatus of claim 4 wherein said function generator generates $(\Delta P/PIN)s$ proportional to $(N/\sqrt{TIN})^n$, $n$ being 2 to 5.

6. Apparatus of claim 4 wherein said function generator compares $\Delta P/PIN$ with $-(\Delta P/PIN)s$, and transmits signals to stop fuel supply to the gas turbine when $\Delta P/PIN$ is equal to $(\Delta P/PIN)s$, and controls fuel supply in response to the difference between $\Delta P/PIN$ and $(\Delta P/PIN)s$ within the range wherein $(\Delta P/PIN)$ is greater than $\Delta P/PIN$ which is in turn greater than $(\Delta P/PIN)s$, $(\Delta P/PIN)'$ being the minimum value for avoiding surging, while providing a constant fuel supply within the range wherein $(\Delta P/PIN)$ is equal to or greater than $(\Delta P/PIN)'$.

* * * * *